United States Patent
Ahn

(10) Patent No.: US 8,407,858 B2
(45) Date of Patent: Apr. 2, 2013

(54) SWING HINGE MODULE

(75) Inventor: Sung-Sang Ahn, Seoul (KR)

(73) Assignee: Diabell Co. Ltd, Gyeonggi-do (KR)

( * ) Notice: Subject to any disclaimer, the term of this patent is extended or adjusted under 35 U.S.C. 154(b) by 110 days.

(21) Appl. No.: 13/139,087

(22) PCT Filed: Dec. 8, 2009

(86) PCT No.: PCT/KR2009/007308
§ 371 (c)(1),
(2), (4) Date: Jun. 10, 2011

(87) PCT Pub. No.: WO2010/068015
PCT Pub. Date: Jun. 17, 2010

(65) Prior Publication Data
US 2011/0247177 A1 Oct. 13, 2011

(30) Foreign Application Priority Data
Dec. 12, 2008 (KR) .................. 10-2008-0126666

(51) Int. Cl.
E05F 1/08 (2006.01)

(52) U.S. Cl. .................. 16/286; 16/296; 16/341; 16/386

(58) Field of Classification Search .................. 16/297, 16/299, 335, 337, 339, 355, 357, 360, 374, 16/286, 296, 341, 386; 361/679.08, 679.11, 361/679.02, 679.15, 679.27; 455/90.3, 575.1, 455/575.3, 575.8; 379/433.12, 433.13; 348/373, 348/333.01, 333.06, 794
See application file for complete search history.

(56) References Cited

U.S. PATENT DOCUMENTS

| 3,204,287 | A * | 9/1965 | Gronbach | 16/288 |
|---|---|---|---|---|
| 7,178,202 | B2 * | 2/2007 | Hirtsiefer et al. | 16/366 |
| 7,240,974 | B2 * | 7/2007 | Hirtsiefer | 312/109 |
| 7,500,287 | B2 * | 3/2009 | Brustle | 16/286 |
| 7,562,757 | B2 * | 7/2009 | Dubach et al. | 192/215 |
| 7,624,477 | B2 * | 12/2009 | Chien et al. | 16/286 |
| 7,810,213 | B2 * | 10/2010 | Brustle | 16/286 |
| 7,866,000 | B2 * | 1/2011 | Lee et al. | 16/334 |
| 2005/0137000 | A1 * | 6/2005 | Toh et al. | 455/575.4 |
| 2007/0119024 | A1 * | 5/2007 | Kim | 16/337 |
| 2008/0064342 | A1 * | 3/2008 | Son et al. | 455/90.3 |

FOREIGN PATENT DOCUMENTS

| KR | 10-2006-0115183 | 11/2006 |
|---|---|---|
| KR | 10-0819473 | 4/2008 |
| KR | 10-0845220 | 7/2008 |
| KR | 10-0849284 | 7/2008 |

* cited by examiner

Primary Examiner — Chuck Y. Mah
(74) Attorney, Agent, or Firm — Ladas & Parry LLP

(57) ABSTRACT

The present invention relates to a swing hinge module. The swing hinge module is configured by comprising: a first member in which through-holes are respectively formed at a space unit and a place distanced from the space unit; a fixing ring which is coupled to the space unit; a second member that is placed at the space unit of the first member and is coupled to the first member in order to rotate with respect to the first member; an elastic member of which one end and the other end are respectively connected to the first and second members and elastically supported by each other; and a cam which is prepared between the first and second members to support one end of the elastic member and forces the elastic member to have an eccentric motion.

8 Claims, 3 Drawing Sheets

SWING HINGE MODULE

CROSS-REFERENCE TO RELATED APPLICATIONS

This application is the U.S. National Stage of International Patent Application No. PCT/KR2009/007308 filed on Dec. 8, 2009, which claims priority to Korean Patent Application Number 10-2008-0126666 filed on Dec. 12, 2008, the disclosures of which are hereby incorporated by reference in their entirety.

TECHNICAL FIELD

The present invention relates to a swing hinge module, and more particularly to a swing hinge module capable of dispersing pressures applied to an elastic member by supporting the elastic member in a cam type fashion to reduce an elastic force generated at the elastic member, thereby providing a slim structure.

The present invention further relates to a swing hinge module capable of allowing a plurality of tubular rotary bodies to be rotated by an elastically supporting force while being elastically supported to one another, thereby allowing a variety of parts to be installed at a space defined in the tubular rotary body.

BACKGROUND ART

With increasing popularization of portable wireless terminals all over the world, terminals having various functions and designs to satisfy consumer tastes have been placed on the market. Various kinds of portable terminals, including bar type terminals, flip type terminals and flip-up type terminals, have been developed. In recent years, folder type terminals and slide type terminals have been developed and widely used. In the slide type terminals, a slide body slides on a main body by a predetermined distance in the longitudinal direction of the terminal, thereby achieving the opening operation of the slide type terminal. A user may push and pull the slide body, thereby achieving more convenient use of the slide type terminal. Consequently, it may be possible to reduce the size of the slide type terminal while providing a display having a size similar to that of the folder type terminal, and therefore, the slide type terminal is preferred as a high-quality product. Slide type terminals adopt an automatic sliding structure in which, once the slide body is pushed a predetermined distance or more, the slide body automatically moves a desired distance. Various kinds of hinge apparatuses have been developed to implement such an automatic sliding structure. Further, various kinds of hinge apparatuses adapted for a variety of terminals have been continuously developed.

DISCLOSURE

Technical Problem

Therefore, the present invention has been made in view of the above problems, and it is an object of the present invention to provide a swing hinge module capable of dispersing pressures applied to an elastic member by supporting the elastic member in a cam type fashion to reduce an elastic force generated at the elastic member, thereby providing a slim structure.

It is another object of the present invention to provide a swing hinge module capable of allowing a plurality of tubular rotary bodies to be rotated by an elastically supporting force while being elastically supported to one another, thereby allowing a variety of parts to be installed at a space defined in the tubular rotary body.

Technical Solution

In accordance with an aspect of the present invention, the above and other objects can be accomplished by the provision of a swing hinge module including a first member having a space portion and a through hole formed at a position spaced apart from the space portion, a fixing ring coupled to the space portion, a second member located at the space portion of the first member and coupled to the fixing ring to be rotated with respect to the first member, an elastic member to allow the first member and the second member to be elastically supported to each other, one side and the other side of the elastic member being respectively connected to the first member and the second member, and a cam arranged between the first member and the second member to support one side of the elastic member, and to guide a camming movement of the elastic member.

The second member may include a slot formed at a position spaced apart from a rotating center of the second member so that the elastic member moves according to rotation of the second member in a state in which one side of the elastic member is coupled through the slot.

The cam may include a first cam surface and a second cam surface formed along an outer circumferential surface of the cam, the first and second cam surfaces may have different slant angles with respect to an imaginary horizontal line, respectively, the first cam surface may have a relatively smaller slant angle than the second cam surface, an engagement portion may be formed at one end of the second cam surface, and the second cam surface may have a curved structure in which a slant angle is gradually reduced as the second cam surface is closer to the engagement portion 144.

Also, the elastic member may include an extension bar connected to the first member or the second member.

Advantageous Effects

The present invention has an effect of dispersing pressures applied to an elastic member by supporting the elastic member in a cam type fashion to reduce an elastic force generated at the elastic member, thereby providing a slim structure.

Also, the present invention has an effect of allowing a plurality of tubular rotary bodies to be rotated by an elastically supporting force while being elastically supported to one another, thereby allowing a variety of parts to be installed at a space defined in the tubular rotary body.

DESCRIPTION OF DRAWINGS

The above and other objects, features and other advantages of the present invention will be more clearly understood from the following detailed description taken in conjunction with the accompanying drawings, in which.

BEST MODE

In accordance with an aspect of the present invention, a swing hinge module includes a first member having a space portion and a through hole formed at a position spaced apart from the space portion, a fixing ring coupled to the space portion, a second member located at the space portion of the first member and coupled to the fixing ring to be rotated with respect to the first member, an elastic member to allow the first member and the second member to be elastically supported to each other, one side and the other side of the elastic member being respectively connected to the first member and the second member, and a cam arranged between the first member and the second member to support one side of the elastic member, and to guide a camming movement of the elastic member.

The second member may include a slot formed at a position spaced apart from a rotating center of the second member so that the elastic member moves according to rotation of the second member in a state in which one side of the elastic member is coupled through the slot.

The cam may include a first cam surface and a second cam surface formed along an outer circumferential surface of the cam, the first and second cam surfaces may have different slant angles with respect to an imaginary horizontal line, respectively, the first cam surface may have a relatively smaller slant angle than the second cam surface, an engagement portion may be formed at one end of the second cam surface, and the second cam surface may have a curved structure in which a slant angle is gradually reduced as the second cam surface is closer to the engagement portion 144.

Also, the elastic member may include an extension bar connected to the first member or the second member.

Hereinafter, an exemplary embodiment of the present invention will be described with reference to the accompanying drawings.

Figure 1:
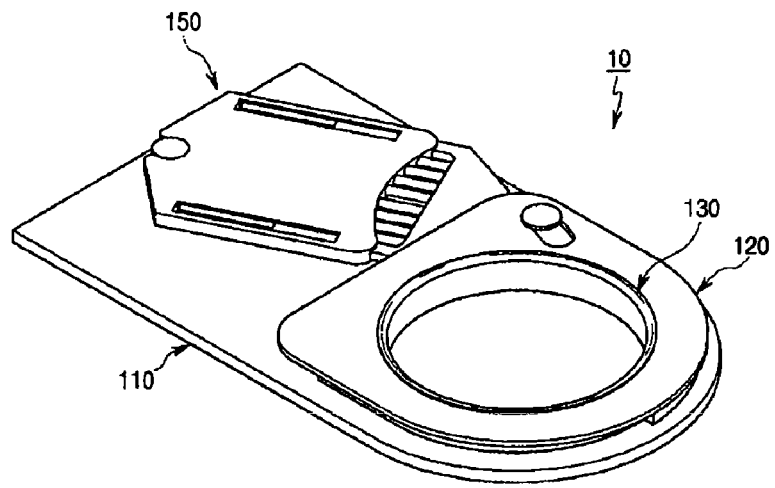
FIG. 1 is a perspective view illustrating a swing hinge module according to an exemplary embodiment of the present invention.
Figure 2:
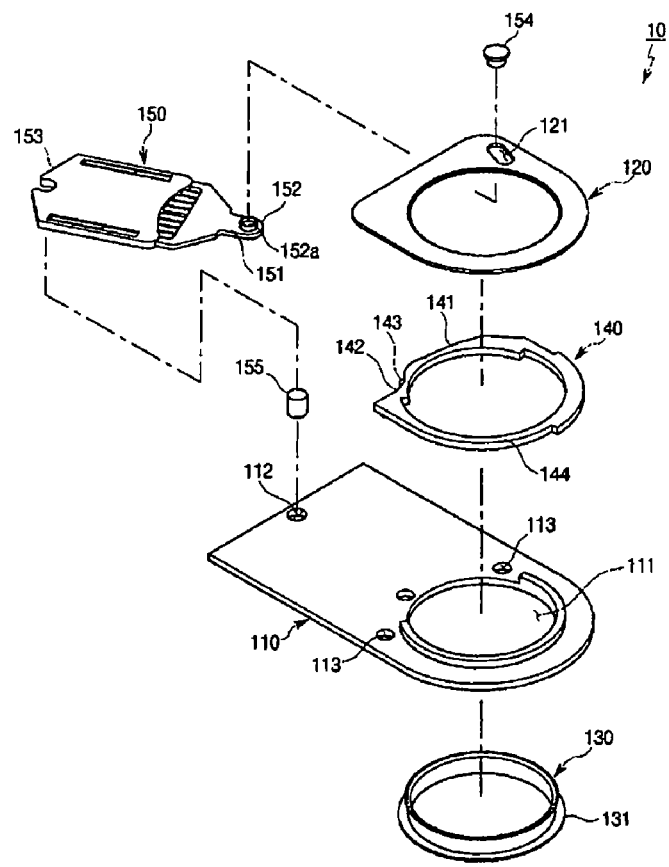
FIG. 2 is an exploded perspective view illustrating the swing hinge module shown in FIG. 1.

As shown in FIGS. 1 and 2, a swing hinge module 10 includes a first member 110, a second member 120, a fixing ring 130, a cam 140, and an elastic member 150.

The first member 110 has a flat plate shape. The first member 110 is opened at one side thereof to form a circular space portion 111. A through hole 112 is formed through the first member 110 at a position spaced apart from the space portion 111. Also, a plurality of coupling holes 113 is formed through the first member 110 at positions spaced apart from one another along the circumference of the space portion 111.

The second member 120 has a flat plate shape. The second member 120 includes a circular opening portion concentric to the space portion 111. A slot 121 is formed through the second member 120 at a position spaced apart from the center of the opening portion of the second member 120 to extend outwards.

The fixing ring 130 has a tubular shape. The fixing ring 130 includes a rim 131 which is formed to protrude from a lower end of the outer circumferential surface of the fixing ring 130.

Figure 3:
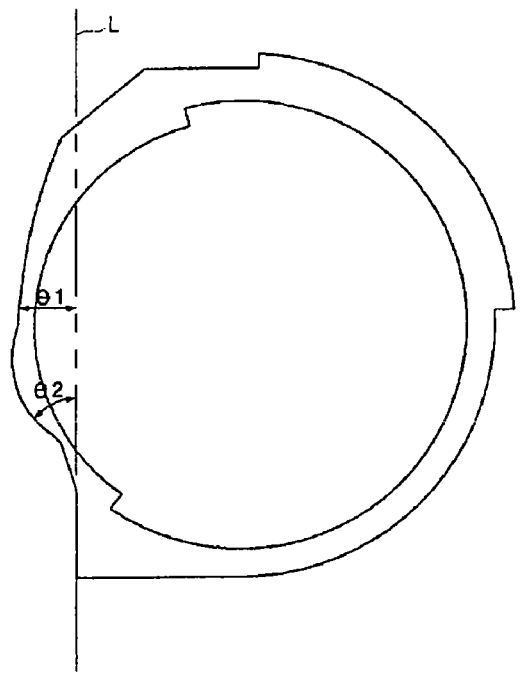
FIG. 3 is a top view illustrating a cam shown in FIG. 2.

The cam 140 has a ring shape and includes a first cam surface 141 and a second cam surface 142 formed at one side of the outer circumferential surface of the cam 140. An engagement portion 144 is formed at an end of the second cam surface 142. A plurality of coupling protrusions 143 is formed to protrude from a lower surface of the cam 140. Also, as shown in FIG. 3, the first and second cam surfaces 141 and 142 have different slant angles θ1 and θ2 with respect to an imaginary horizontal line L, respectively. The slant angle θ1 of the first cam surface 141 is relatively smaller than the slant angle θ2 of the second cam surface 142. The slant angle θ2 of the second cam surface 142 is gradually reduced as the second cam surface 142 is closer to the engagement portion 144.

The elastic member 150 includes a first push rod 151 and a second push rod 153 elastically supported by a plurality of springs (not shown) disposed within the elastic member 150. Such a configuration is similar to a hinge typically used, and therefore a detail description thereof will not be given. However, the elastic member 150 includes an extension bar 152 extending from the first push rod 151 and coupling pins 154 and 155. Here, the coupling pin 154 has a groove (not shown) which is upwardly recessed from the bottom of the coupling pin 154.

The components of the swing hinge module according to the exemplary embodiment of the present invention are coupled as follows. The fixing ring 130 is inserted into the space portion 111. Subsequently, the cam 140 is fitted around the outer circumferential surface of the fixing ring 130 so that the coupling protrusions 143 of the cam 140 are coupled to the coupling holes 113 of the first member 110, respectively. As a result, the cam 140 may be fixed to the first member 110.

Thereafter, the coupled elastic member 150 is located on the first member 110, and then the coupling pin 155 is inserted through the through hole 112 of the first member 110 so that the second push rod 153 is coupled to the first member 110. Subsequently, the second member 120 is located on the first push rod 151 so that the slot 121 and a protrusion 152a of the extension bar 152 overlap with each other. In this state, the coupling pin 154 is inserted through the slot 121 of the second member 120 so that the coupling pin 154 is fitted to the protrusion 152a. In this case, a gap is formed between the coupling pin 154 and the protrusion 152a which are coupled to each other, so that the coupling pin 154 and the protrusion 152a may be moved along the slot 121.

Subsequently, the second member 120 is fitted around the fixing ring 130, and then an upper end of the fixing ring 130 is radially expanded outwards, thereby fixing the second member 120 to the fixing ring 130. In this case, a stepped portion is formed at an upper portion of the fixing ring 130. The second member 120 is inserted to a position corresponding to the stepped portion of the fixing ring 130 to prevent the second member 120 from interfering with an upper surface of the cam 140. As a result, the second member 120 may be rotated along with the fixing ring 130, and the first member 110 and the cam 140 may be fixed together.

Hereinafter, the operation of the swing hinge module according to the exemplary embodiment of the present invention will be described with reference to the accompanying drawings.

Figure 4:
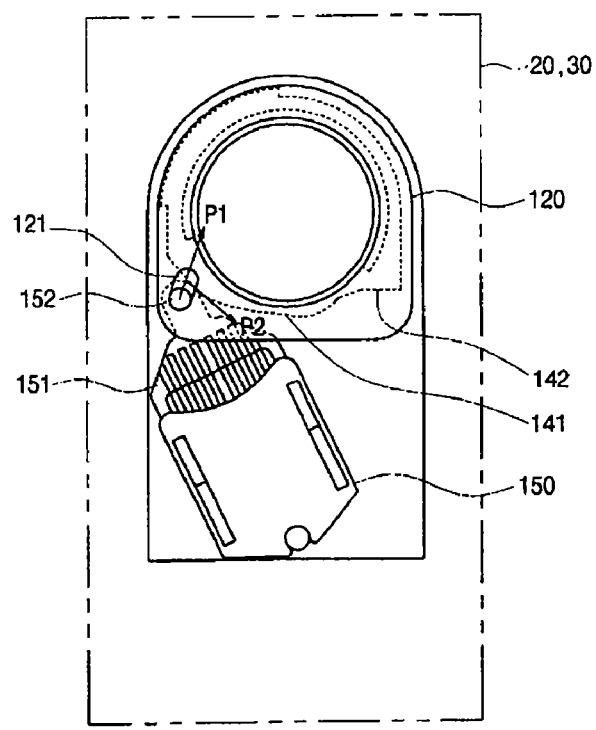
FIGS. 4 to 6 are operation views illustrating operation states of the swing hinge module according to the exemplary embodiment of the present invention, respectively.

Referring to FIG. 4, the swing hinge module is arranged between a liquid crystal screen 20 and a key button portion 30 to rotate the liquid crystal screen 20 with respect to the key button portion 30, thereby opening and closing the key button portion 30. The first member 110 is provided at the key button portion 30, whereas the second member 120 is provided at the liquid crystal screen 20. The elastic member 150 elastically supports the first member 110 and the second member 120. The extension bar 152 of the first push rod 151 comes into contact with the outer circumferential surface of the cam 140 provided between the first member 110 and the second member 120. In this state, the elastic member 150 applies a pressure P1 to the extension bar 152 in a direction toward the first member 110 through the slot 121 by an elastic force generated from the elastic member 150. On the other hand, the cam 140 applies a pressure P2 to the extension bar 152 through the first cam surface 141 in a direction toward the elastic member 150. In other words, the first cam surface 141 is pressurized by the elastic force generated from the elastic member 150, so that the first member 110 is elastically supported.

Figure 5:
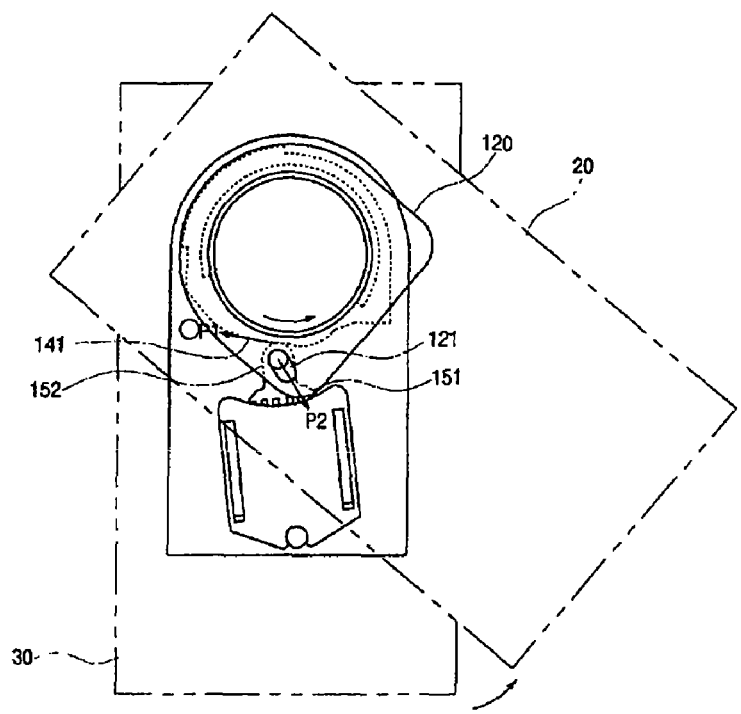

In this operational relation, as shown in FIG. 5, the second member 120 connected to the liquid crystal screen 20 is rotated when the liquid crystal screen 20 is rotated in the direction indicated by an arrow of FIG. 5. As a result, the extension bar 152 moves along the first cam surface 141 while the coupling pin 154 inserted through the slot 121 is pressurized by an inner circumferential surface of the slot 121 formed at the second member 120. In this case, the pressure P1 acts along the first cam surface 141 by the slant angle θ1 of the first cam surface so that the extension bar 152 is pressurized, whereas the pressure P2 acts so that the extension bar 152 is pressurized against the elastic member 150 through the slot 121 by the rotated first member 110, thereby causing the elastic member 150 to generate an elastic force. That is, the extension bar 152 is pressurized together by the first cam surface 141 having the slant angle θ1 and the slot 121, due to actions of the pressures P1 and P2 simultaneously applied to the extension bar 152 even when the pressures P1 and P2 act in opposite directions. As a result, the pressures that cause the elastic member 150 to generate an elastic force may be dispersed by the first cam surface 141 and the slot 121, so that it may be possible to generate the elastic force using a relatively small force.

Figure 6:
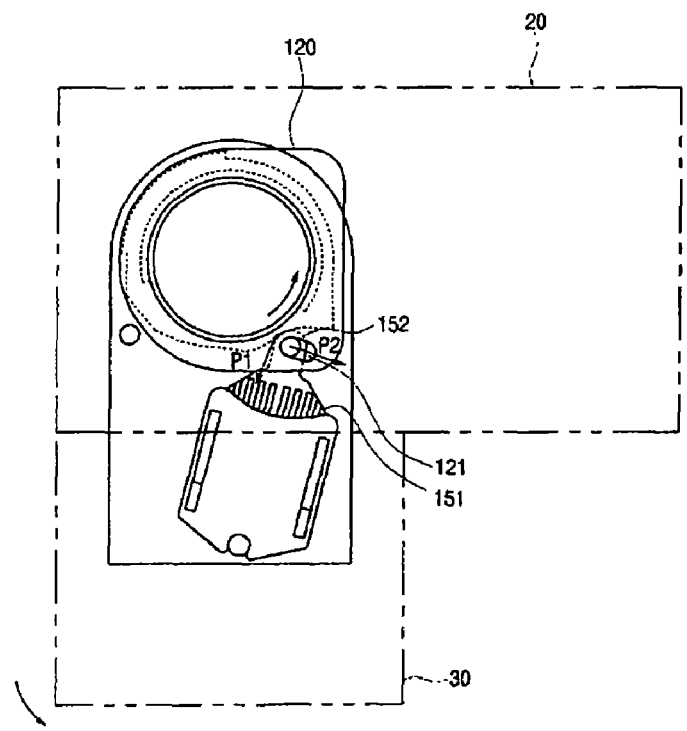

Subsequently, as shown in FIG. 6, the elastic member 150, from which the elastic force is generated, passes an inflection point when the extension bar 152 passes the first cam surface 141, and then moves to the second cam surface 142 while pressurizing the second cam surface 142 by the elastic force. In this case, the pressure P2 is applied to the extension bar 152 through the slot 121 by the second cam surface 142, thereby pressurizing the extension bar 152. Also, the pressure P1 is applied to the extension bar 152 against the elastic member 150 through the slot 121. As a result, the first member is supported by the dispersed pressurizing force.

Meanwhile, the engagement portion 144 formed at the end of the second cam surface 142 may prevent the extension bar 152 from being separated from the second cam surface 142 and from slipping along the slot 121.

As described above, the extension bar 152 which extends from the elastic member 150 is pressurized by the slot 121 formed at the second member 120 and the cam 140, thereby dispersing the elastic force generated from the elastic member 150. As a result, a spring force which is the elastic force generated from the elastic member may be small according to the pressure, which is reduced, to pressurize the elastic member 150, thereby providing the elastic member 150 having a slim structure.

Various embodiments have been described in the best mode for carrying out the invention.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claims is:

1. A swing hinge module comprising:
 a first member having a space portion and a through hole formed at a position spaced apart from the space portion;
 a fixing ring coupled to the space portion;
 a second member located at the space portion of the first member and coupled to the fixing ring to be rotated with respect to the first member;
 an elastic member to allow the first member and the second member to be elastically supported to each other, one side of the elastic member being rotatable connected to the through hole of the first member, and the other side of the elastic member being movably connected to the second member;
 a cam arranged between the first member and the second member to support said other side of the elastic member, and to guide a camming movement of the elastic member.

2. The swing hinge module according to claim 1, wherein the second member comprises a slot formed at a position spaced apart from a rotating center of the second member so that the elastic member moves according to rotation of the second member in a state in which the other side of the elastic member is movably coupled through the slot.

3. The swing hinge module according to claim 1, wherein the cam comprises a first cam surface and a second cam surface formed along an outer circumferential surface of the cam.

4. The swing hinge module according to claim 3, wherein the first and second cam surfaces have different slant angles with respect to an imaginary horizontal line passing through two intersection points with said outer circumferential surface, respectively.

5. The swing hinge module according to claim 4, wherein the first cam surface has a relatively smaller slant angle than the second cam surface.

6. The swing hinge module according to claim 5, wherein an engagement portion is formed at one end of the second cam surface.

7. The swing hinge module according to claim 6, wherein the second cam surface has a curved structure in which a slant angle is gradually reduced as the second cam surface is closer to the engagement portion.

8. The swing hinge module according to claim 1, wherein the elastic member comprises an extension bar connected to the first member or the second member.

* * * * *